United States Patent [19]

Simon et al.

[11] Patent Number: 5,677,038
[45] Date of Patent: Oct. 14, 1997

[54] HOT-MELT ADHESIVE COMPOSITION FOR THE COATING OF INTERLINING MATERIAL

[75] Inventors: Ulrich Simon, Herne; Siegfried Hahn, Henneff-Stossdorf, both of Germany

[73] Assignee: Huels Aktiengesellschaft, Marl, Germany

[21] Appl. No.: 621,062

[22] Filed: Mar. 22, 1996

[30] Foreign Application Priority Data

Mar. 22, 1995 [DE] Germany .................. 195 10 315.7

[51] Int. Cl.$^6$ ........................................... C09J 7/02
[52] U.S. Cl. ..................... 428/196; 428/349; 428/354; 428/355; 442/150
[58] Field of Search ........................ 428/261, 343, 428/354, 355, 349, 196; 442/150

[56] References Cited

U.S. PATENT DOCUMENTS

| | | | |
|---|---|---|---|
| 4,073,827 | 2/1978 | Okasaka | 260/835 |
| 4,139,613 | 2/1979 | Hefele | 427/197 |
| 4,141,869 | 2/1979 | Hoss | 260/29.15 B |
| 4,144,538 | 3/1979 | Chapman | 346/153 |
| 4,477,636 | 10/1984 | Murio | 525/444 |
| 4,551,521 | 11/1985 | McConnell | 528/302 |
| 4,748,044 | 5/1988 | Fottinger | 427/44 |
| 5,439,737 | 8/1995 | Trabelsi | 428/317.7 |

*Primary Examiner*—Jenna Davis
*Attorney, Agent, or Firm*—Oblon, Spivak, McClelland, Maier & Neustadt, P.C.

[57] ABSTRACT

A hot-melt adhesive composition for the preparation of cleaning-resistant laminated materials which have a particularly high wash resistance.

9 Claims, No Drawings

HOT-MELT ADHESIVE COMPOSITION FOR THE COATING OF INTERLINING MATERIAL

BACKGROUND OF THE INVENTION

1. Field of the Invention

The present invention relates to a hot-melt adhesive composition for the coating of sheet structures, for example textiles, leather, foam materials or polymer films. The invention further relates, in particular, to a hot-melt adhesive composition for the coating, optionally in a pattern, of bondable interlining materials for the clothing industry, especially for outer clothing.

2. Discussion of the Background

Hot-melt adhesive compositions which are preferably applied in a pattern, in the form of an aqueous paste, to a sheet structure to be coated are known. Drying and sintering are then carried out. The sintered product constitutes the hot-melt adhesive composition. The coated sheet structures are laminated, in sheet form or cut to shape, with other sheet structures in sheet form or cut to shape, under the action of pressure and a comparatively mild temperature to give cleaning-resistant laminates having a particularly high degree of wash resistance and adhesion.

Numerous hot-melt adhesive compositions having cleaning-resistant properties are known for use in screen-printing. They are principally formed from aqueous-pasty mixtures comprising fine hot-melt adhesive powders, which can also be employed per se, in coarser granular form, directly for coating by the scatter or powder dot method. The cleaning-resistant hot-melt adhesive compositions mostly in use today are based on copolyamides, copolyesters or low-pressure polyethylene. Other hot-melt adhesive compositions which are likewise used are not resistant to cleaning.

To form a paste from fine hot-melt adhesive powders, in order to produce the adhesive layer, special suspension agents or dispersants are used which allow the pastes to be printed cleanly without reducing resistance to cleaning. In addition, dispersants are intended to give rise to particular features in terms of properties, including the prevention of sedimentation of the powders incorporated by mixing, a print with well-defined contours, controlled penetration of the hot-melt adhesive paste, prevention of penetration by the outer material, the avoidance of recoiling in the course of bonding, or the prevention of the edges becoming welded together while the sheet structures are being cut to shape. Examples of such dispersants have been described, for example, in DE-B 20 07 971, DE-B 22 29 308, DE-B 24 07 505, DE-B 25 07 504 and DE-B 35 10 109, all incorporated herein by reference. Plasticizers can be added to the dispersants. In many cases, further additives comprising high molecular weight polyethylene oxide are added, which increase the spreadability of the paste.

For coating in a pattern by the screen-printing technique, screen-printing stencils are used which have a regular or irregular arrangement of perforations through which hot-melt adhesive compositions are pressed onto an interlining material using an internal doctor blade. Whereas formerly screen stencils were used which had a comparatively wide spacing and large apertures, for example 17 mesh, in recent times coatings of increasing fineness have been carried out with a close sequence of smaller apertures, for example 30 mesh, with the formation of small, closely adjacent dots of hot-melt adhesive. Moreover, the interlining materials have become more lightweight, finer and more open. The problems associated with coating have grown as the patterns have become finer, and the cleaning and washing problems have increased simultaneously, since the larger pattern arrangement with larger individual dots produced a greater adhesive strength than the finer pattern arrangement with relatively small individual dots.

The use of interlining materials has also experienced a gradual change. For reasons of fashion and, probably, of environmental protection as well, there is increasing use in articles of clothing of interlining materials which have been or are to be washed rather than cleaned, for example interlinings for leisure wear.

This change in trends has led to the gradual replacement of copolyamide hot-melt adhesives which were originally used exclusively for articles of outer clothing by copolyesters since copolyesters—although not having the particularly good dry-cleaning resistance of the copolyamides—nevertheless possess a better resistance to washing. Low-pressure polyethylenes are excluded because of the excessive bonding temperatures.

Costs and quality issues have dictated a marked reduction in the quantity of coating which is applied per $m^2$ of interlining material. Whereas, formerly, add-ons of from 18 to 25 $g/m^2$ were common, they are nowadays from 7 to 15 $g/m^2$, to meet the need for a soft, flowing drape of the bonded articles of clothing.

In order to solve the problems relating to reduced washing and cleaning resistance and to weaker adhesion, improved hot-melt adhesive compositions and also improved coating technologies were developed. Dualdot or double-dot coatings are described, for example, in patents DE-B 22 14 236, DE-B 22 31 723, DE-B 25 36 911 and DE-B 32 30 579. Moreover, patents EP-A 0 219 376 and EP-A 0 365 711, also incorporated herein by reference, describe an indirect coating method.

The coating substrates were improved by using finer yarns having individual fibers of finer denier, ranging down to the microfiber region, and synthetic yarns, for example high-bulk acrylic yarns and crimped polyester yarns. Moreover, the fabrics originally used have been replaced by other sheet structures, for example by weave-knit products or by weave-knit bonded fibre webs and stitch-bonded webs, the latter materials representing a combination of bonded fibre webs with knitted fabrics.

Deficiencies which continue to exist are seen, in particular, in a stiffening and in a reduced crease-resistance of a bonded laminate of interlining and outer material, especially in the case of finely patterned coatings. A factor regarded as being particularly negative, however, is that, in fine-coated interlining materials on fine outer materials, for example blouse outer materials, and despite the use of polyesters, the wash resistance of the bonded laminate is no more than moderate and in many cases is even deficient. There therefore continues to be a considerable need for an interlining of low coating weight which can be applied by hot pressing at the mild fixing temperatures which are nowadays conventional and which imparts a soft bonded handle, can be washed without any problems and retains a high adhesive strength after the washing procedure.

In particular there is a great need for such interlinings in women's outer wear. Here, depending on fashions, outer materials which lend themselves very unreadily to bonding, such as silk, polyester viscose georgette and siliconized or fluorocarbonized outer materials, are processed. The current interlinings achieve very good primary adhesion, but after washing or cleaning complete detachment occurs. Even complex coating methods such as the traditional double dot and indirect coating techniques provide hardly any success in this context.

OBJECTS OF THE INVENTION

It is one object of the present invention to provide a hot-melt adhesive composition which, with a reduced coating amount, has a high adhesive strength and outstanding resistance to washing and cleaning and which addresses the above-described deficiencies of the prior art.

Another object of the present invention is to provide an adhesive composition having the strength and wash characteristics described in the above object which can be applied to nonwovens, charmeuse and weaveknit fabrics, and primarily to interlinings having weights of from 15 to 40 g/m$^2$, preferably interlinings which have been pretreated with silicones or silicone plasticizers.

Another object of the present invention is to provide a hot-melt adhesive composition having the properties of one or both of the above-described objects and which can be used in particular for double dot coating.

DETAILED DESCRIPTION OF THE INVENTION

It has now surprisingly been found that a hot-melt adhesive composition comprising a base layer mixture of (1) copolyamide and/or copolyester and (2) low-pressure polyethylene and an overlying top layer comprising a thermoplastic hot-melt adhesive and an epoxide meets the above objects.

The thermoplastic hot-melt adhesive in the top layer preferably comprises a copolyester, a copolyamide or both. Suitable examples of each are given in the *Polymer Handbook* 3rd Ed., Brandrup, J. et al Eds., John Wiley, New York, 1989 and the Kirk-Othmer *Encyclopedia of Chemical Technology*, 3rd Ed., Wiley, New York, Vol. 18 (1982) and Vol. 6 (1979). Preferred top layer copolyesters are those having the following characteristics: Mp=120° C., MF/160°=60 g/10 min, and comprising the following monomer units: Base: DMT, Isophthala sure, B$_1$D. Preferred top layer copolyamides are those having the following characteristics: Mp=108° C., MF/160° C.=100 g/10 min, and comprising the following monomer units: Base LL, CL, DDS/MPD.

Preferred top layer epoxides include those based on bisphenol A epoxide. The epoxide preferably has a melting point of 65° to 110° C., more preferably a melting point of from 95° to 110° C., an epoxide equivalent of from 450 to 6,000 g/equivalent, preferably from 2,400 to 4,000 g/equivalent, and a particle size of from 1 to 80 μm. The proportion of epoxide is preferably from 5 to 25% by weight, based on the dry weight of the top layer. The top layer preferably includes the following: from 0 to 25% by weight of copolyamide, from 50 to 95% by weight of copolyester and from 5 to 25% by weight of epoxide all based on total dry weight of top layer. Critical to the invention is the proportion of epoxide, preferably bisphenol A epoxide. The top layer according to the invention preferably comprises a low-melting (i.e., mp≦107° C.) copolyamide having a content of bisphenol A epoxide or a low-melting (i.e., mp≦110° C.) copolyester having a content of bisphenol A epoxide.

For the base layer, suitable copolyamides are those having the following characteristics: high melting point>122° C., high melt viscosity and comprising the following monomer units: LL, CL, AH-salt. Suitable copolyesters are those having the following characteristics: high melting point>122° C. high viscosity and comprising the following monomer units: DMT, isophthalicacid, B$_1$D. Other copolyamides and copolyesters useful here are given in in the *Polymer Handbook* 3rd Ed., Brandrup, J. et al Eds., John Wiley, New York, 1989 and the Kirk-Othmer *Encyclopedia of Chemical Technology*, 3rd Ed., Wiley, New York, Vol. 18 (1982) and Vol. 6 (1979), all incorporated herein by reference. The term "low pressure polyethylene" refers to high density polyethylene. Suitable low pressure polyethylene have the following characteristics: Mp 128°–130° C., DSC 129, MFR 20 g/10 min. 2.16 Kg at 190° C. Density: 0.954.

The hot-melt adhesive composition of the invention is, in the case of double dot coating, applied, in accordance with the invention, to the article to be coated, for example an interlining for an article of clothing, preferably in such a way that first of all the hot-melt adhesive paste base layer is applied by the screen-printing technique. This base layer can preferably contain, as adhesive composition, a mixture of low-pressure polyethylene and a high-melting (i.e., mp≦132° C.) copolyamide in a weight ratio of 60:40. On top of this is applied the top layer. Particularly suitable is the invention top layer which is scattered on. After it has been scattered on, the interlining material is set in vibration and the powder which does not adhere to the base layer is then removed.

In order to form a paste from the mixture of at least one of a copolyamide and a copolyester with the low-pressure polyethylene for the base layer, solvents and dispersants may be used. Examples of solvents include water, thickener and dispersing agents. Examples of useful dispersants include those described in the Patent documents mentioned in the introduction, DE-B 20 07 971, DE-B 22 29 308, DE-B 24 07 505 and DE-B 35 10 109. Particularly suitable dispersants are those based on ethoxylated fatty alcohols having 12 to 18 carbon atoms in the chain with degrees of ethoxylation of from 3 to 5 with a thickener based on polyacrylic acid or polymethacrylic acid, which dispersants are employed in the wet hot-melt adhesive paste in a proportion of from 0.5 to 2% by weight. The solids content of the invention hot-melt adhesive paste is preferably from 30 to 50% by weight.

The top layer of the hot-melt adhesive composition according to the invention preferably comprises a commercial copolyamide and/or copolyester, for example VESTAMELT X 7352, VESTAMELT 730, VESTAMELT 4581 from Hüls AG. Particular preference is given here, as has surprisingly turned out to be the case, to a mixture of bisphenol A epoxide and a low-melting (mp<120° C.) copolyester or to a mixture of a bisphenol A epoxide and a copolyamide. The top layer is preferably scattered onto the base layer, the material of the top layer preferably being a powder mixture. The mixture preferably has a predominant particle range (i.e., >95% of all particles) of from 80 to 160 μm.

EXAMPLES

The top coat of the hot-melt adhesive composition according to the invention preferably contains a copolyamide, copolyester or mixtures thereof. Particular preference is given here, as surprisingly turned out to the be case, to the use of a mixture of copolyester with a bisphenol A epoxide or of a mixture of copolyamide and a bisphenol A epoxide. The top layer is preferably scattered onto the base layer, the top layer being a powder. The mixture predominantly has a particle range of from 80 to 160 μm. In the two-layer coating of hot-melt adhesive paste and powder, the weight-ratio of hot-melt adhesive paste (dry) to top-layer powder is preferably about 1:1.

The hot-melt adhesive paste used as base layer has the following composition:
Water 6.30 parts by weight
Mirox HP 0.15 part by weight (polyacrylic acid derivative)
INTRASOL 1218/5 0.30 part by weight (ethoxylated fatty alcohol)
VESTAMELT 751-P1 1.00 part by weight (copolyamide)
Schättifix 1820-P1 1.50 parts by weight (low-pressure polyethylene)

The copolyamide employed is VESTAMELT 751-P1 from Heüls AG having the following characteristics:
VESTAMELT 751-P1
Particle size 1 to 80 µm
Melt index (160° C., 21.6N) 14 g/10 min
m.p., melting-point tube 108° C.
m.p., DSC 98° C.

The low-pressure polyethylene used to produce the paste (LP-polyethylene: Schättifix 1820-P1) has the following characteristics:
Particle size 1 to 80 µm
Melt index (190° C., 21.6N) 20 g/10 min
Melting point 130° C.
Manufacturer: Schätti, CH The paste additives are stirred together in the sequence given above (i.e., from top to bottom, water first, polyethylene last). The paste is applied to a coating substrate through the perforations of a 25 mesh screen stencil with a regular dot arrangement, using an internal doctor blade. The coating substrate is a stitch-bonded nonwoven of 30 g/m² made from PES/PA fibers (30:70). The nonwoven has PES warp multifilaments knitted through it. The paste add-on is from about 5 to 6 g/m² when dry. After coating, the wet base layer is scattered with the powder mixture according to the invention comprising copolyester and epoxide to form a top layer (see below).

The top layer is a mixture of the copolyester VESTAMELT 4581 (90% by weight) and a bisphenol A epoxide (10% by weight) having an epoxide equivalent of from 2,400 to 4,000 and a softening point (Kofler) of from 100° to 110° C. The add-on by scattering is from about 5 to 6 g/m².

After the base layer has been covered with scattered material, the nonwoven is set in vibration using a high-speed rotary beater mechanism. The powder which does not adhere to the wet base layer is removed by blowing it off and extracting it by suction. Drying and sintering are then carried out. The finished interlining is then bonded to an outer material and the adhesive strength is measured.

Comparison example

As comparison example, a base layer is applied as in the above manner. The top layer applied by scattering, however, is only the copolyester, with no epoxide. Following extraction by suction, drying and sintering, adhesion measurements are carried out.

| Specimen from | Outer material | adhesion after bonding | 1 × washing at 40° C. | 3 × DC |
|---|---|---|---|---|
| Example | silk | 6.5 | 5.5 | 6.5 |
|  | polyester georgette | 5.8 | 4.5 | 6.0 |
| Comparison example prior art | silk | 4.0 | 0.8 | fell apart |
|  | polyester georgette | 2.5 | 0.3 | fell apart |

Evaluation:

The interlining according to the invention, with epoxide, displays a markedly better adhesion after washing and dry cleaning (DC) to outer materials which are difficult to bond. The severe drop in adhesion values after washing and cleaning is very much in evidence in the case of the comparison example.

What is claimed as new and desired to be secured by Letters Patent of the Unites States is:

1. A hot-melt adhesive comprising a base layer and a top layer, wherein said top layer is a thermoplastic hot-melt adhesive consisting essentially of a copolyamide and/or a copolyester and at least one epoxide, the epoxide content in the top layer being from 5 to 25% by weight based on the total weight of the top layer, and said base layer comprises a mixture of (a) a copolyamide and/or copolyester, and (b) a low pressure polyethylene.

2. The hot-melt adhesive according to claim 1, wherein the top layer comprises:

from 0 to 25% by weight of copolyamide
from 50 to 95% by weight of copolyester
from 5 to 25% by weight of epoxide.

3. The hot-melt adhesive composition according to claim 1, wherein the epoxide is a bisphenol A epoxide.

4. The hot-melt adhesive composition according to claim 3, wherein the bisphenol A epoxide has a melting point of from 65° to 110° C., an epoxide equivalent of from 450 to 6,000 g/equivalent and a particle size of from 1 to 80 µm.

5. The hot-melt adhesive composition according to claim 4, wherein the bisphenol A epoxide has a melting point of from 95° to 110° C., an epoxide equivalent of from 2,400 to 4,000 g/equivalent and a particle size of from 1 to 80 µm.

6. An interlining fabric material for clothing, comprising, impregnated therein and/or on the surface of the fabric material, the hot-melt adhesive according to claim 1.

7. An interlining fabric material for clothing, comprising, impregnated therein and/or on the surface of the fabric material, the hot-melt adhesive according to claim 4.

8. A method for assembling clothing, comprising applying the hot-melt adhesive of claim 1 to an interlining material.

9. The method as claimed in claim 8, wherein said top layer is applied as a top dot material in a double dot application.

* * * * *